United States Patent [19]

Kao et al.

[11] 4,065,280

[45] Dec. 27, 1977

[54] CONTINUOUS PROCESS FOR MANUFACTURING OPTICAL FIBERS

[75] Inventors: Charles K. Kao; James E. Goell; Mokhtar S. Maklad, all of Roanoke, Va.

[73] Assignee: International Telephone and Telegraph Corporation, Nutley, N.J.

[21] Appl. No.: 751,282

[22] Filed: Dec. 16, 1976

[51] Int. Cl.² ............................................. C03B 37/02
[52] U.S. Cl. .................................... 65/3 A; 65/121; 65/DIG. 6
[58] Field of Search .................. 65/86, 87, 89, 121, 65/DIG. 6, 3 A

[56] References Cited

U.S. PATENT DOCUMENTS

| 3,288,583 | 11/1966 | Sheldon | 65/3 A X |
| 3,843,392 | 10/1974 | Sterling et al. | 65/DIG. 16 X |
| 3,960,530 | 6/1976 | Iyengar | 65/121 X |

*Primary Examiner*—Arthur D. Kellogg
*Attorney, Agent, or Firm*—John T. O'Halloran; Peter C. Van Der Sluys

[57] ABSTRACT

A continuous optical fiber manufacturing process utilizes the method of chemical vapor deposition of the glass forming materials within an R.F. excited glow discharge. The rapid deposition rate within the discharge provides a sufficient stream of glass material for winding into a finished fiber on a synchronous take-up mechanism. Alternate embodiments include an oxygen air stream to remove dust particles from the fiber surface and an in-line fluorine stream to terminate surface bonding and reduce moisture attack on fiber surfaces.

12 Claims, 3 Drawing Figures

CONTINUOUS PROCESS FOR MANUFACTURING OPTICAL FIBERS

BACKGROUND OF THE INVENTION

Various methods are proposed for manufacturing optical fiber glass in a continuous process. One method is that disclosed in U.S. Pat. No. 3,957,474 assigned to Nippon Telegraph and Telephone Public Corp. This method involves the deposition of the glass forming ingredients on a heated mandrel to form a fiber optic preform.

The method described in U.S. Pat. No. 3,614,197 assigned to Semiconductor Research Foundation describes the process of using a multi-stepped funnel-shaped heating vessel to form a solid glass rod which is subsequently heated and drawn into an optical fiber. Both the heated mandrel and the heated crucible process provide continuous means for forming optical fiber glass into a solid glass preform but do not suggest forming the optical fiber per se in an in-line continuous process where the raw materials are fed into one end of the process while a finished optical fiber is continuously drawn from the other end.

It was first believed that the formation of a solid optical fiber preform as a separate step in the fiber manufacturing process provided certain beneficial results. The rod could be tested for optical transmission properties as well as geometric uniformity before being drawn into a fiber. These measurements could be used to select the best candidates from a number of fiber optical preforms before investing time and effort into drawing large quantities of the resultant optical fibers.

The purpose of this invention is to provide methods and apparatus for forming high strength and high purity optical fibers in a single continuous manufacturing operation.

SUMMARY OF THE INVENTION

Starting materials for high purity, high strength optical fibers are distilled into a specially designed high temperature container which allows the materials to be co-deposited without intermixing in a continuous flow. The materials are distilled into a vapor phase and are rapidly deposited by a localized R.F. glow discharge. The energy is also provided to heat the ingredients to a liquid state for drawing through a controlled orifice into an optical fiber within an enclosed chamber. The fiber is optionally treated by a filtered oxygen jet stream to cool the liquid and to exclude any air borne dust particles from the solidified fiber surface. Other features include the use of a fluorine gas flow to prevent any water from reacting with the finished fiber structure. The fiber is coated with a soft plastic film before leaving the environmental enclosure and exposure to air in the fiber drawing process.

BRIEF DESCRIPTION OF THE DRAWINGS

FIG. 3 is a cross-section of an optical fiber manufactured by the apparatus shown in FIGS. 1 and 2.

DESCRIPTION OF THE INVENTION

Since a great deal of time and equipment is required for manufacturing optical fibers by means of a fiber optic preform various attempts were studied in a search for a continuous and economically feasible fiber drawing process. In order to determine whether increased fiber drawing speeds could be realized without affecting the quality of the resultant optical fiber experiments were performed by drawing fibers on existing equipment using fiber optic preforms at increasing drawing speeds. Evaluating the resultant fibers for optical and strength properties surprisingly revealed that the increased drawing speeds rather than adversely affecting the optical properties of the fiber produced fibers having lower optical loss. The reason for the improved optical properties with optical fibers drawn at fast drawing rates is not well understood but it is believed due to the decrease in Rayleigh scattering losses possibly caused by the more uniform glass density in the fibers drawn at increased drawing rates.

In order to utilize the added benefits accompanying the fast fiber drawing rates in a continuous fiber making process without the use of fiber optic preforms various methods were considered for producing the starting materials at a sufficient rate to supply the faster fiber drawing process.

The high purity deposition of chemicals from the vapor phase process was selected as the best source of high purity material but was discounted as too slow for use with high speed fiber drawing apparatus. However, when depositing the core and fiber materials simultaneously and using a method of distillation such as chemical vapor disposition sufficient fiber material can be produced to sustain the faster fiber drawing speeds when a glow discharge is utilized.

The use of a localized R.F. field to create a glow discharge results in a material deposition rate 10 times as fast as the deposition rate which occurs when electric heaters are employed in the deposition process. The material deposits uniformly and rapidly upon the surface of the crucible. The R.F. generated glow discharge may be introduced to the region within the crucible through the use of a plasma jet arrangement. The crucible may be heated by R.F. heating to ensure that the glass deposited will be kept at a molten state and flow into the orifice.

The method of chemical vapor deposition by means of an R.F. glow discharge is described in U.S. patent application Ser. No. 696,991, filed June 17, 1976 (Uffen-2Y) and assigned to the assignee of the instant invention. The R.F. glow discharge in the aforementioned application was used for forming layers of core and cladding materials on the inner surface of a silica tube. The silica tube was subsequently collapsed to form a preform and the preform was heated and drawn into an optical fiber.

DESCRIPTION OF THE PREFERRED EMBODIMENT

Figure 1:
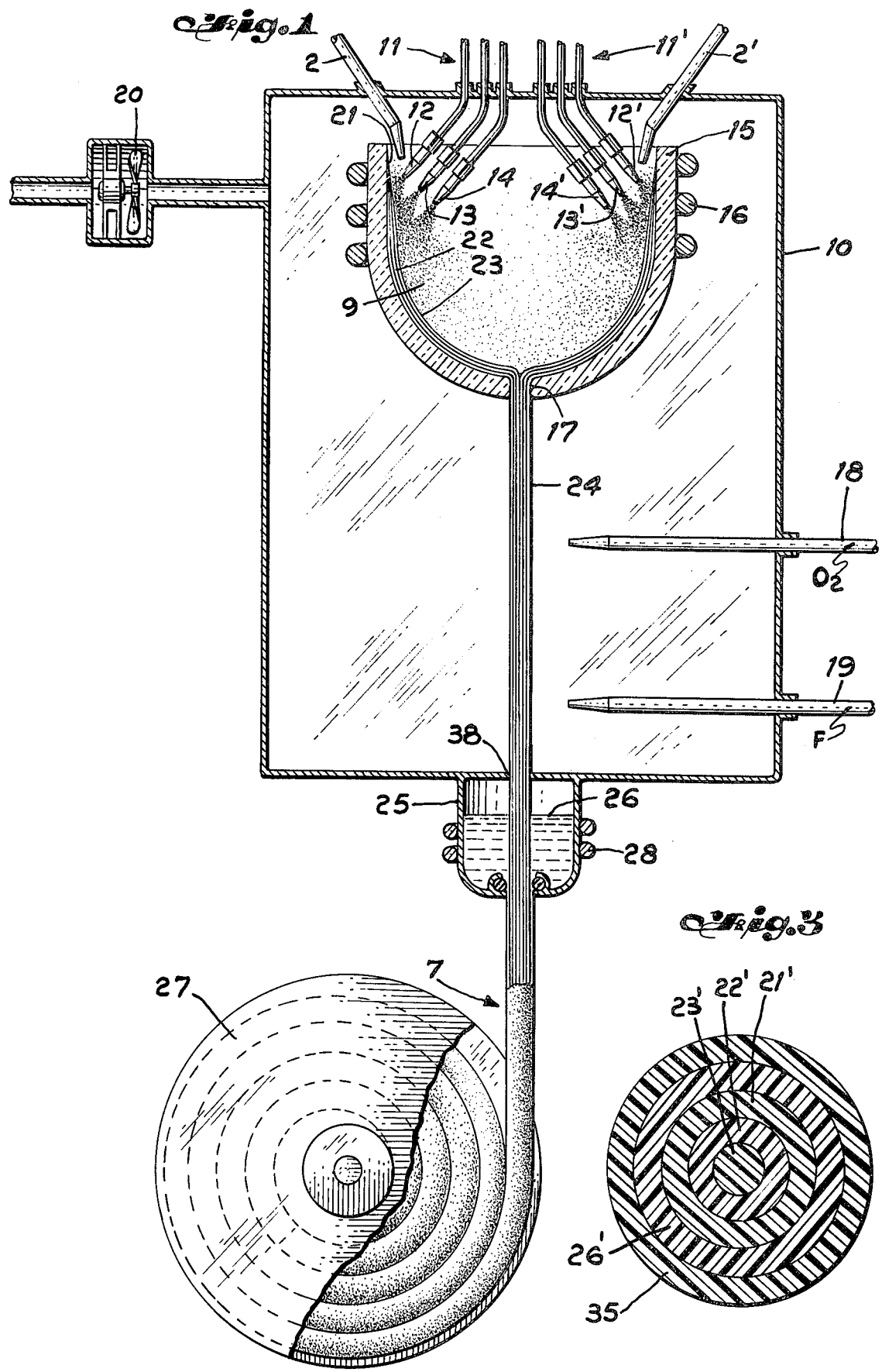
FIG. 1 is a sectional view of one type of apparatus used in the continuous fiber making process of this invention.

The continuous high strength, low loss fiber of this invention can be processed on the apparatus of FIG. 1 which consists of an enclosure 10 completely enclosing crucible 15. Extending through enclosure 10 are a series of nozzles generally designated as 11 which introduce the fiber making materials in gaseous form upon the inner surface of crucible 15. Crucible 15 is surrounded by R.F. coils 16 for crucible heating. An R.F. glow discharge is introduced through plasma jets 2, 2' and the material for depositing is emitted from nozzles 11 in a vapor form. The vapor particles 9 reacts in the plasma and forms glass which rapidly deposit upon the surface of the crucible 15 in a series of uniform glassy layers. For the purpose of this embodiment three of the nozzles 11 are described, however, since each of the individual nozzles contributes to a separate layer of material any number of nozzles can be provided depending upon the number of layers desired. Here the first nozzle 12 contributes to the first layer of material 21, the second nozzle 13 provides the material for the second layer 22 and the third nozzle 14 provides the third and innermost layer 23. A corresponding series of nozzles 11' designated respectively as 12', 13' and 14' are used to insure that the resulting layers will be uniformly distributed around the circumference of the crucible 15. Once the material is deposited upon the heated crucible 15 the resultant glass layers 21, 22 and 23 flow through orifice 17 under the tension exerted by take-up reel 27. The fiber 24 therefore concentrically contains each of the corresponding glass layers 21, 22 and 23 with the innermost layer 23 constituting the core.

Since the entire glass deposition process occurs within the enclosure 10 various elemental gases can be introduced to the fiber in order to control the fiber chemistry. Oxygen, for example, can be introduced through the oxygen intake nozzle 18 where the oxygen is directed upon the fiber surface to cool and chill the fiber 24 and to exclude any air borne dust particles from the surface of the fiber 24 and further to insure that the fiber 24 remains dust-free while within the enclosure 10. Additional chemicals can be introduced during the fiber drawing process as desired. A fluorine intake nozzle 19, for example, can provide a steady stream of fluorine gas in order to terminate surface bonding and prevent moisture attack and the formation of OH radicals. Exhaust fan 20 insures that the by-products of the chemical vapor deposition process will be continuously removed from the enclosure 10 and that high concentrations of oxygen and fluorine do not build up at any time during the fiber drawing process.

In order to insure that the drawn fiber 24 remains dust-free and mositure free, fiber 24 is exited from the enclosure 10 by means of orifice 38 through which the fiber 24 traverses into a container 25 of plastic 26. The fiber 24 is completely wet and coated by the plastic 26 before exposure to the atmosphere and before being wound on take-up reel 27.

When doped core optical fibers are manufactured by the apparatus of FIG. 1, the third layer 23 forms the doped core of the resultant optical fiber 24. The second layer 22 provides a low refractive index cladding layer and the first layer 21 provides the outer optical cladding. Suitable materials for forming the doped core optical fiber are provided by the halides of the desired materials since the halides can be readily transferred in vapor form entrained within a carrier gas such as oxygen. When silicon tetrachloride is entrained within oxygen then the silicon tetrachloride-oxygen mixture when introduced to crucible 15 by means of nozzle 12 forms a glow discharge under the influence of a strong R.F. field produced by R.F. coil 16 and produces a first layer 21 consisting essentially of silica. When boron trichloride and silicon tetrachloride vapors are entrained with oxygen and transported into crucible 15 by means of nozzle 13 then, in a similar manner, the second layer 22 consists essentially of borosilicate glass. Using germanium and silicon tetrachloride vapor within a stream of oxygen gas and transporting the mixture within crucible 15 by means of nozzle 14 the third layer 23 consists essentially of germanium silicate glass.

FIG. 3 shows a cross-section of the coated fiber 7 which consists of a core 23' formed from the third layer 23, an interface layer 22' formed from second layer 22 and a cladding layer 21' formed from the first layer 21. The soft plastic layer 26' can be overcoated with a hard plastic layer 35 if desired. The core can, of course, have a graded profile.

Figure 2:
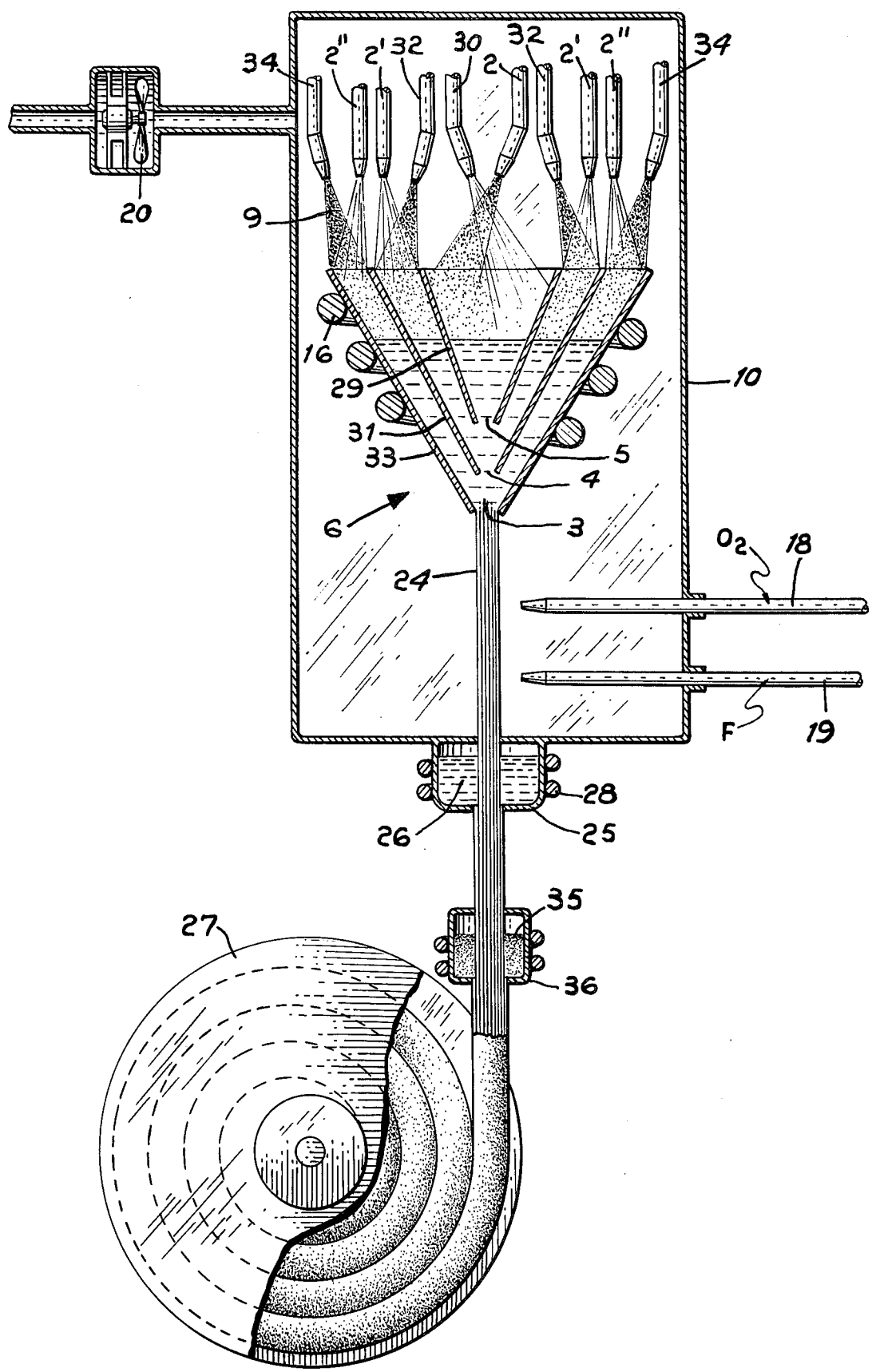
FIG. 2 is a sectional view of another apparatus used with the fiber making process of this invention.

Although R.F. glow discharge techniques provide separate layers within a common crucible as described for the embodiment of FIG. 1, multi-component optical fibers can also be manufactured by a multi-layered crucible technique as described in FIG. 2. Since some of the elements of the apparatus of FIG. 1 provide a similar function in the apparatus of FIG. 2, common reference numerals will be employed wherever possible. In the embodiment of FIG. 2 the enclosure 10 having exhaust 20 and intake nozzles 18 and 19 includes a multi-layered crucible generally designated as 6 and containing a first concentric crucible 29, a second crucible 31 and a third crucible 33. R.F. coils 16 concentrically extend around multi-layered crucible 6 for the purpose of providing crucible heating. The R.F. glow discharge is introduced in a manner similar to that described for the embodiment of FIG. 1 through plasma jets 2, 2' and 2". The materials for generating the optical fiber glass enter the crucible 6 by means a first inlet 30, a second inlet 32 and a third inlet 34. Each of these inlets communicate respectively with corresponding first crucible 29, second crucible 31 and third crucible 33. The materials entering each of these crucibles provides a vapor 9 within the R.F. glow discharges generated as shown in FIG. 2 and become deposited on the inner surface of the respective crucibles in a manner similar to that described for the R.F. glow discharge of the embodiment of FIG. 1. Heating the multi-layered crucible 6 by R.F. coils 16 causes the material to flow through the series of corresponding orifices 5, 4 and 3 to produce a continuous fiber 24 having a concentric layered structure corresponding to the materials selected for each of the crucibles 29, 31 and 33. The advantage of the multi-layered crucible 6 of the embodiment of FIG. 2 over the single crucible of FIG. 1 is the generation of the vapor material 9 in separate enclosures for the embodiment of FIG. 2 to insure that the individual components of the vapor material 9 will not mix while in the gaseous state. This is particularly important when graded index optical fibers are formed where each of the concentric layers of the fiber cross-section contain very carefully determined variations in material concentration. The embodiment of FIG. 2 contains an in-line plastic extruder 36 containing a hard plastic material 35. This combination of the outer hard plastic layer 35 and soft plastic layer 26 as shown in FIG. 3 greatly improves the resistance of the coated optical fiber 7 to stress when subjected to sharp bends.

The combination of a plurality of optical fiber component materials simultaneously deposited by a radio frequency glow discharge process combined with a fast fiber drawing mechanism can produce a strong optical fiber having a low optical loss. The choice of the chemical vapor deposition method to continuously distill high purity materials avoids the losses due to absorption caused by hydroxyl and transitional metal ion impurities while the fast fiber draw mechanism decreases losses caused by Rayleigh scattering. The use of the controlled environmental enclosure along with continuous oxygen flow across the fiber surface during the fiber drawing operation insures that air borne dust particles will not be present on the fiber surface when the fiber is being encapsulated in a protective plastic coating.

The glow discharge-chemical vapor deposition method deposits the glass at a rate substantially faster than standard thermal methods of decomposition and is an important factor in the development of the inventive fiber drawing process. R.F. excitation is employed to create an electrodeless discharge which efficiently deposits the glass components onto the surface of the crucible without the need for auxiliary electrodes. However, D.C. type glow discharges may be employed for the deposition process but require electrodes for setting up an electric field to cause the plasma to occur. Plasma torches are used to heat the glass forming components when an R.F. field is used for crucible heating.

Although fibers produced by the method of this invention find application in the field of optical communications, this is by way of example only. The fibers produced by the method of this invention may be used wherever fibers having high tensile strengths and good optical transmitting properties may be required.

What is claimed is:

1. A continuous process for manufacturing optical fibers comprising the steps of:
   depositing glass by a chemical vapor reaction onto at least one crucible having an orifice;
   heating the crucible in order to melt the glass;
   drawing the glass through the orifice into a fiber; and
   coating the fiber with a plastic cladding.

2. The method of claim 1 wherein the glass is deposited by means of a glow discharge.

3. The method of claim 1 including the step of continually flushing an oxygen containing gas onto the surface of the fiber to avoid dust particles from depositing on the fiber surface.

4. The method of claim 1 including the step of flushing a fluorine containing gas onto the fiber surface to avoid OH formation on the fiber surface.

5. The method of claim 1 including the step of depositing the glass onto the crucible in a series of separate layers wherein the separate layers form corresponding concentric regions within the cross-section of the fiber.

6. The method of claim 1 including the step of providing a plurality of said crucibles each having a corresponding plurality of concentric orifices.

7. The method of claim 6 including the step of introducing a plurality of separate glass compositions into each of said crucibles.

8. The method of claim 1 wherein said chemical vapor reaction comprises the dissociation of silicon boron, phosphorous, aluminum and germanium halides selected from the group consisting of boron, phosphorus, silicon, aluminum and germanium.

9. The method of claim 1 including the step of winding the fiber on a take-up reel.

10. The method of manufacturing a continuous optical fiber comprising the steps of:
    introducing glass components into a crucible having an orifice;
    depositing the glass components on an interior surface of the crucible in a plurality of separate and distinct layers by chemical vapor deposition within a glow discharge;
    heating the crucible to melt the glass components; and
    drawing the optical fiber through the orifice while continuously depositing the glass components onto the surface of the heated crucible.

11. The method of claim 10 wherein said crucible comprises a multi-chambered crucible and wherein each of the glass components is introduced into a separate chamber of the crucible.

12. The method of claim 11 including the step of coating the optical fiber with a plastic coating after drawing the fiber through the orifice of the crucible.

* * * * *